US012694879B2

(12) United States Patent
Fersch et al.

(10) Patent No.: US 12,694,879 B2
(45) Date of Patent: Jul. 28, 2026

(54) METHOD AND APPARATUS FOR METADATA-BASED DYNAMIC PROCESSING OF AUDIO DATA

(71) Applicants: Dolby Laboratories Licensing Corporation, San Francisco, CA (US); DOLBY INTERNATIONAL AB, Dublin (IE)

(72) Inventors: Christof Fersch, Neumarkt (DE); Scott Gregory Norcross, San Rafael, CA (US)

(73) Assignees: Dolby Laboratories Licensing Corporation, San Francisco, CA (US); DOLBY INTERNATIONAL AB, Dublin (IE)

(*) Notice: Subject to any disclaimer, the term of this patent is extended or adjusted under 35 U.S.C. 154(b) by 98 days.

(21) Appl. No.: 18/685,413

(22) PCT Filed: Aug. 24, 2022

(86) PCT No.: PCT/US2022/041388
§ 371 (c)(1),
(2) Date: Feb. 21, 2024

(87) PCT Pub. No.: WO2023/028154
PCT Pub. Date: Mar. 2, 2023

(65) Prior Publication Data

US 2024/0355338 A1 Oct. 24, 2024

Related U.S. Application Data

(60) Provisional application No. 63/251,307, filed on Oct. 1, 2021, provisional application No. 63/237,231, filed on Aug. 26, 2021.

(30) Foreign Application Priority Data

Aug. 26, 2021 (EP) .................................... 21193209

(51) Int. Cl.
*G10L 19/00* (2013.01)
*G10L 25/03* (2013.01)

(52) U.S. Cl.
CPC .............. *G10L 19/00* (2013.01); *G10L 25/03* (2013.01)

(58) Field of Classification Search
CPC ........................................................ G10L 19/00
See application file for complete search history.

(56) References Cited

U.S. PATENT DOCUMENTS 9,628,037 B2 4/2017 Riedl
10,699,726 B2 * 6/2020 Baumgarte ............. H04S 7/307
(Continued)

FOREIGN PATENT DOCUMENTS

RU 2639663 C2 12/2017
RU 2734741 C1 10/2020
(Continued)

OTHER PUBLICATIONS

ETSI TS 103 190-2 V1.2.1. Feb. 2018. Digital Audio Compression (AC-4) Standard; Part 2: Immersive and personalized audio. 250 pages.
(Continued)

*Primary Examiner* — Shaun Roberts

(57) ABSTRACT

Described herein is a method of metadata-based dynamic processing of audio data for playback, the method including: receiving, by a decoder, a bitstream including audio data and metadata for dynamic loudness adjustment; decoding, by the decoder, the audio data and the metadata to obtain decoded audio data and the metadata; determining, by the decoder, from the metadata, one or more processing parameters for dynamic loudness adjustment based on a playback condition; applying the determined one or more processing parameters to the decoded audio data to obtain processed
(Continued)

audio data; and outputting the processed audio data for playback. Described is further a method of encoding audio data and metadata for dynamic loudness adjustment into a bitstream. Moreover, described are a respective decoder and encoder, a respective system and computer program products.

13 Claims, 5 Drawing Sheets

(56) References Cited

U.S. PATENT DOCUMENTS

| | | | | |
|---|---|---|---|---|
| 10,820,134 | B2 | 10/2020 | Stein | |
| 10,886,883 | B2 | 1/2021 | Mabande | |
| 10,958,229 | B2 | 3/2021 | Baumgarte | |
| 2016/0219387 | A1 | 7/2016 | Ward | |
| 2017/0032793 | A1* | 2/2017 | Baumgarte | G10L 19/008 |
| 2018/0091917 | A1 | 3/2018 | Chon | |
| 2018/0095718 | A1 | 4/2018 | Riedmiller | |
| 2018/0218742 | A1 | 8/2018 | Baumgarte | |
| 2019/0378524 | A1 | 12/2019 | Baumgarte | |
| 2020/0412313 | A1 | 12/2020 | Coover | |
| 2021/0004204 | A1 | 1/2021 | Küch | |
| 2021/0084426 | A1 | 3/2021 | Chung | |

FOREIGN PATENT DOCUMENTS

| | | | |
|---|---|---|---|
| WO | 2020069120 | A1 | 4/2020 |
| WO | 2020185025 | A1 | 9/2020 |

OTHER PUBLICATIONS

Exploring object-based content adaptation for mobile audio, Tim Walton, Michael Evans, David Kirk, Frank Melchior. Personal and Ubiquitous Computing, vol. 22, Issue 4, Aug. 2018, pp. 707-720 https://doi.org/10.1007/s00779-018-1125-6.

ISO/IEC 23003-4, Dynamic Range Control, 2nd Edition, 122. MPEG Meeting; Apr. 16, 2018-Apr. 20, 2018; San Diego; (Motion Picture Expert Group or ISO/IEC JTC1/SC29/WG11), No. n17643 Jun. 5, 2018 (Jun. 5, 2018), XP030262172. 209 Pages.

Jeffrey Riedmiller et al: "Delivering Scalable Audio Experiences using AC-4", IEEE Transactions on Broadcasting., vol. 63, No. 1, Feb. 24, 2017 (Feb. 24, 2017), pp. 179-201, XP055611935. p. 179-201. 23 Pages.

* cited by examiner

METHOD AND APPARATUS FOR METADATA-BASED DYNAMIC PROCESSING OF AUDIO DATA

CROSS REFERENCE TO RELATED APPLICATIONS

This application is a U.S. National Stage application under U.S.C. 371 of International Application No. PCT/US2022/041388, filed on Aug. 24, 2022, which claims priority to European Patent Application No. 21193209.0, filed 26 Aug. 2021 and U.S. provisional application 63/237,231, filed 26 Aug. 2021, and 63/251,307, filed 1 Oct. 2021, all of which are incorporated herein by reference in their entirety.

TECHNOLOGY

The present disclosure relates generally to a method of metadata-based dynamic processing of audio data for playback and, in particular, to determining and applying one or more processing parameters to the audio data for dynamic loudness adjustment and/or dynamic range compression. The present disclosure further relates to a method of encoding audio data and metadata for dynamic loudness adjustment and/or dynamic range compression into a bitstream. The present disclosure yet further relates to a respective decoder and encoder as well as to a respective system and computer program products.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

In playing back audio content, loudness is the individual experience of sound pressure. In cinematic or television content, the loudness of dialogue in a program has been found to be the most crucial parameter determining the perception of program loudness by a listener.

To determine the average loudness of a program, either of the full program or dialogue only, analysis of the entire program has to be performed. The average loudness is typically required for loudness compliance (for example, the CALM act in the US), and is also used for aligning dynamic range control (DRC) parameters. The dynamic range of a program is the difference between its quietest and loudest sounds. The dynamic range of a program depends on its content, for example, an action movie may have a different and wider dynamic range than a documentary, and reflects a creator's intent. However, capabilities of devices to play back audio content in the original dynamic range vary strongly. Besides loudness management, dynamic range control is thus a further key factor in providing optimal listening experience.

To perform loudness management and dynamic range control, the entire audio program or an audio program segment has to be analyzed and the resulting loudness and DRC parameters can be delivered along with audio data or encoded audio data to be applied in a decoder or playback device.

When analysis of an entire audio program or an audio program segment prior to encoding is not available, for example in real-time (dynamic) encoding, loudness processing or levelling is used to ensure loudness compliance and, if applicable, potential dynamic range constraints depending on playback requirements. This approach delivers processed audio that is "optimized" for a single playback environment.

There is thus an existing need for metadata-based processes that deliver "original" unprocessed audio with accompanying metadata allowing the playback device to use the metadata to modify the audio dynamically depending on device constraints or user requirements.

SUMMARY

In accordance with a first aspect of the present disclosure there is provided a method of metadata-based dynamic processing of audio data for playback. The method may include receiving, by a decoder, a bitstream including audio data and metadata for dynamic loudness. The method may further include decoding, by the decoder, the audio data and the metadata to obtain decoded audio data and the metadata. The method may further include determining, by the decoder, from the metadata, one or more processing parameters for dynamic loudness adjustment based on a playback condition. The method may further include applying the determined one or more processing parameters to the decoded audio data to obtain processed audio data. And the method may include outputting the processed audio data for playback.

The metadata for dynamic loudness adjustment may include a plurality of sets of metadata, with each set corresponding to a respective (e.g., different) playback condition. Then, determining the one or more processing parameters for dynamic loudness adjustment from the metadata based on a (specific) playback condition may include selecting, in response to playback condition information provided to the decoder, a set of metadata corresponding to the (specific) playback condition, and extracting the one or more processing parameters for dynamic loudness adjustment from the selected set of metadata. Therein, the playback condition information may be indicative of the (specific) playback condition or information derived therefrom.

In some embodiments, the metadata may be indicative of processing parameters for dynamic loudness adjustment for a plurality of playback conditions.

In some embodiments, said determining the one or more processing parameters may further include determining one or more processing parameters for dynamic range compression, DRC, based on the playback condition.

In some embodiments, the playback condition information may be indicative of a specific loudspeaker setup. In general, the playback condition may include one or more of a device type of the decoder, characteristics of a playback device, characteristics of a loudspeaker, a loudspeaker setup, characteristics of background noise, characteristics of ambient noise and characteristics of the acoustic environment.

In some embodiments, the selected set of metadata may include a set of DRC sequences, DRCSet. Further, each of the sets of metadata may include a respective set of DRC sequences, DRCSet. In general, said determining the one or more processing parameters may be said to further include selecting, by the decoder, at least one of a set of DRC sequences, DRCSet, a set of equalizer parameters, EQSet, and a downmix, corresponding to the playback condition.

In some embodiments, said determining the one or more processing parameters may further include identifying a metadata identifier indicative of the at least one selected DRCSet, EQSet and downmix to determine the one or more processing parameters from the metadata. Specifically, selecting the set of metadata may include identifying a set of metadata corresponding to a specific downmix. The specific downmix may be determined based on the loudspeaker setup.

In some embodiments, the metadata may include one or more processing parameters relating to average loudness values and optionally one or more processing parameters relating to dynamic range compression characteristics. Specifically, each set of metadata may include such one or more processing parameters relating to average loudness values and optionally one or more processing parameters relating to dynamic range compression characteristics.

In some embodiments, the bitstream may further include additional metadata for static loudness adjustment to be applied to the decoded audio data.

In some embodiments, the bitstream may be an MPEG-D DRC bitstream and the presence of metadata may be signaled based on MPEG-D DRC bitstream syntax.

In some embodiments, a loudnessInfoSetExtension( )-element may be used to carry the metadata as a payload.

In some embodiments, the metadata may comprise one or more metadata payloads, wherein each metadata payload may include a plurality of sets of parameters and identifiers, with each set including at least one of a DRCSet identifier, drcSetId, an EQSet identifier, eqSetId, and a downmix identifier, downmixId, in combination with one or more processing parameters relating to the identifiers in the set.

In some embodiments, said determining the one or more processing parameters may involve selecting a set among the plurality of sets in the payload based on the at least one DRCSet, EQSet, and downmix selected by the decoder, wherein the one or more processing parameters determined by the decoder may be the one or more processing parameters relating to the identifiers in the selected set.

In accordance with a second aspect of the present disclosure there is provided a decoder for metadata-based dynamic processing of audio data for playback. The decoder may comprise one or more processors and non-transitory memory configured to perform a method including receiving, by the decoder, a bitstream including audio data and metadata for dynamic loudness adjustment; decoding, by the decoder, the audio data and the metadata to obtain decoded audio data and the metadata; determining, by the decoder, from the metadata, one or more processing parameters for dynamic loudness adjustment based on a playback condition; applying the determined one or more processing parameters to the decoded audio data to obtain processed audio data; and outputting the processed audio data for playback.

The metadata for dynamic loudness adjustment may include a plurality of sets of metadata, with each set corresponding to a respective (e.g., different) playback condition. Then, determining the one or more processing parameters for dynamic loudness adjustment from the metadata based on a (specific) playback condition may include selecting, in response to playback condition information provided to the decoder, a set of metadata corresponding to the (specific) playback condition, and extracting the one or more processing parameters for dynamic loudness adjustment from the selected set of metadata. Therein, the playback condition information may be indicative of the (specific) playback condition or information derived therefrom.

In accordance with a third aspect of the present disclosure there is provided a method of encoding audio data and metadata for dynamic loudness adjustment, into a bitstream. The method may include inputting original audio data into a loudness leveler for loudness processing to obtain, as an output from the loudness leveler, loudness processed audio data. The method may further include generating the metadata for dynamic loudness adjustment based on the loudness processed audio data and the original audio data. And the method may include encoding the original audio data and the metadata into the bitstream.

In some embodiments, the metadata may include a plurality of sets of metadata. Each set of metadata may correspond to a respective (e.g., different) playback condition.

In some embodiments, the method may further include generating additional metadata for static loudness adjustment to be used by a decoder.

In some embodiments, said generating metadata may include comparison of the loudness processed audio data to the original audio data, wherein the metadata may be generated based on a result of said comparison.

In some embodiments, said generating metadata may further include measuring the loudness over one or more pre-defined time periods, wherein the metadata may be generated further based on the measured loudness.

In some embodiments, the measuring may comprise measuring overall loudness of the audio data.

In some embodiments, the measuring may comprise measuring loudness of dialogue in the audio data.

In some embodiments, the bitstream may be an MPEG-D DRC bitstream and the presence of the metadata may be signaled based on MPEG-D DRC bitstream syntax.

In some embodiments, a loudnessInfoSetExtension( )-element may be used to carry the metadata as a payload.

In some embodiments, the metadata may comprise one or more metadata payloads, wherein each metadata payload may include a plurality of sets of parameters and identifiers, with each set including at least one of a DRCSet identifier, drcSetId, an EQSet identifier, eqSetId, and a downmix identifier, downmixId, in combination with one or more processing parameters relating to the identifiers in the set, and wherein the one or more processing parameters may be parameters for dynamic loudness adjustment by a decoder.

In some embodiments, the at least one of the drcSetId, the eqSetId, and the downmixId may be related to at least one of a set of DRC sequences, DRCSet, a set of equalizer parameters, EQSet, and downmix, to be selected by the decoder.

In accordance with a fourth aspect of the present disclosure there is provided an encoder for encoding in a bitstream original audio data and metadata for dynamic loudness adjustment. The encoder may comprise one or more processors and non-transitory memory configured to perform a method including inputting original audio data into a loudness leveler for loudness processing to obtain, as an output from the loudness leveler, loudness processed audio data; generating the metadata for dynamic loudness adjustment based on the loudness processed audio data and the original audio data; and encoding the original audio data and the metadata into the bitstream.

In accordance with a fifth aspect of the present disclosure there is provided a system of an encoder for encoding in a bitstream original audio data and metadata for dynamic loudness adjustment, and a decoder for metadata-based dynamic processing of audio data for playback.

In accordance with a sixth aspect of the present disclosure there is provided a computer program product comprising a computer-readable storage medium with instructions adapted to cause the device to carry out a method of metadata-based dynamic processing of audio data for playback or a method of encoding audio data and metadata for dynamic loudness adjustment, into a bitstream when executed by a device having processing capability.

In accordance with a seventh aspect of the present disclosure there is provided a computer-readable storage medium storing the computer program product described herein.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Overview

Figure 1:
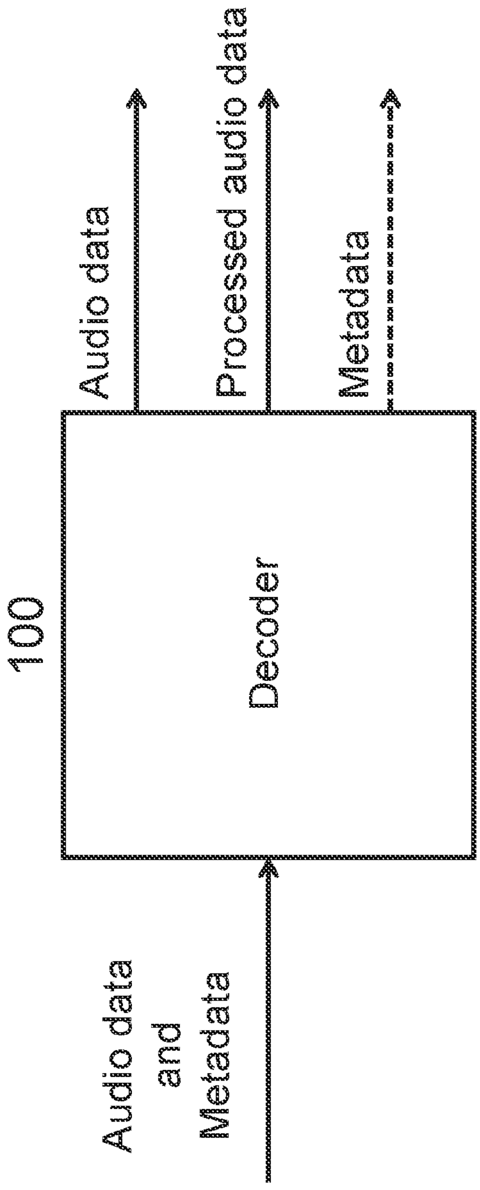
FIG. 1 illustrates an example of a decoder for metadata-based dynamic processing of audio data for playback.

The average loudness of a program or dialogue is the main parameter or value used for loudness compliance of broadcast or streaming programs. The average loudness is typically set to −24 or −23 LKFS. With audio codecs that support loudness metadata, this single loudness value representing the loudness of the entire program, is carried in the bitstream. Using this value in the decoding process allows gain adjustments that result in predictable playback levels, so that programs play back at known consistent levels. Therefore, it is important that this loudness value is set properly and accurately. Since the average loudness is dependent on measuring the entire program prior to encoding, for real-time situations such as dynamic encoding with unknown loudness and dynamic range variation, this is, however, not possible.

When it is not possible to measure the loudness of the entire file prior to encoding, a dynamic loudness leveler is often used to modify or contour the audio data prior to encoding so that it meets the required loudness. This type of loudness management is often seen as an inferior method to meet compliance, as it often changes the dynamic range intercorrelation in the audio content and may thus change the creative intent. This is especially the case when it is desired to distribute one audio asset for all playback devices, which is one of the benefits of metadata driven codec and delivering systems.

In some approaches, audio content is mixed with the required target loudness, and the corresponding loudness metadata is set to that value. A loudness leveler might still be used in those situations as it will be used to help steer the audio content to the target loudness but it will not be that "active" and is only used to when the audio content starts to deviate from the required target loudness.

In view of the above, methods and apparatus described herein aim at making real-time processing situations, also denoted as dynamic processing situations, also metadata driven. The metadata allow for dynamic loudness adjustment and dynamic range compression in real-time situations. The methods and apparatus as described advantageously enable:

- Use of real-time loudness adjustment and DRC in MPEG-D DRC syntax;
- Use of real-time loudness adjustment and DRC in combination with downmixId;
- Use of real-time loudness adjustment and DRC in combination with drcSetId;
- Use of real-time loudness adjustment and DRC in combination with eqSetId.

That is, depending on decoder settings (e.g., DRCSet, EQSet, and downmix), a decoder can search based on the syntax a given payload for an appropriate set of parameters and identifiers, by matching the aforementioned settings to the identifiers. The parameters included in the set whose identifiers best match the settings can then be selected as the processing parameters for dynamic loudness adjustment to be applied to received original audio data for correction.

Further, multiple sets of parameters for dynamic processing (multiple instances of dynLoudCompValue) can be transmitted.

The metadata-driven dynamic loudness compensation, in addition to correcting the overall loudness, can also be used to "center" the DRC gain calculation and application. This centering may be a result of correcting the loudness of the content, via the dynamic loudness compensation, and how DRC is typically calculated and applied. In this sense, metadata for dynamic loudness compensation can be said to be used for aligning DRC parameters.

Metadata-Based Dynamic Processing of Audio Data

Referring to the example of FIG. 1, a decoder 100 for metadata-based dynamic processing of audio data for playback is described. The decoder 100 may comprise one or more processors and non-transitory memory configured to perform a method including the processes as illustrated in the example of FIG. 2 by means of steps S101 to S105.

The decoder 100, may receive a bitstream including audio data and metadata and may be able to output the unprocessed (original) audio data, the processed audio data after application of dynamic processing parameters determined from the metadata and/or the metadata itself depending on requirements.

Figure 2:
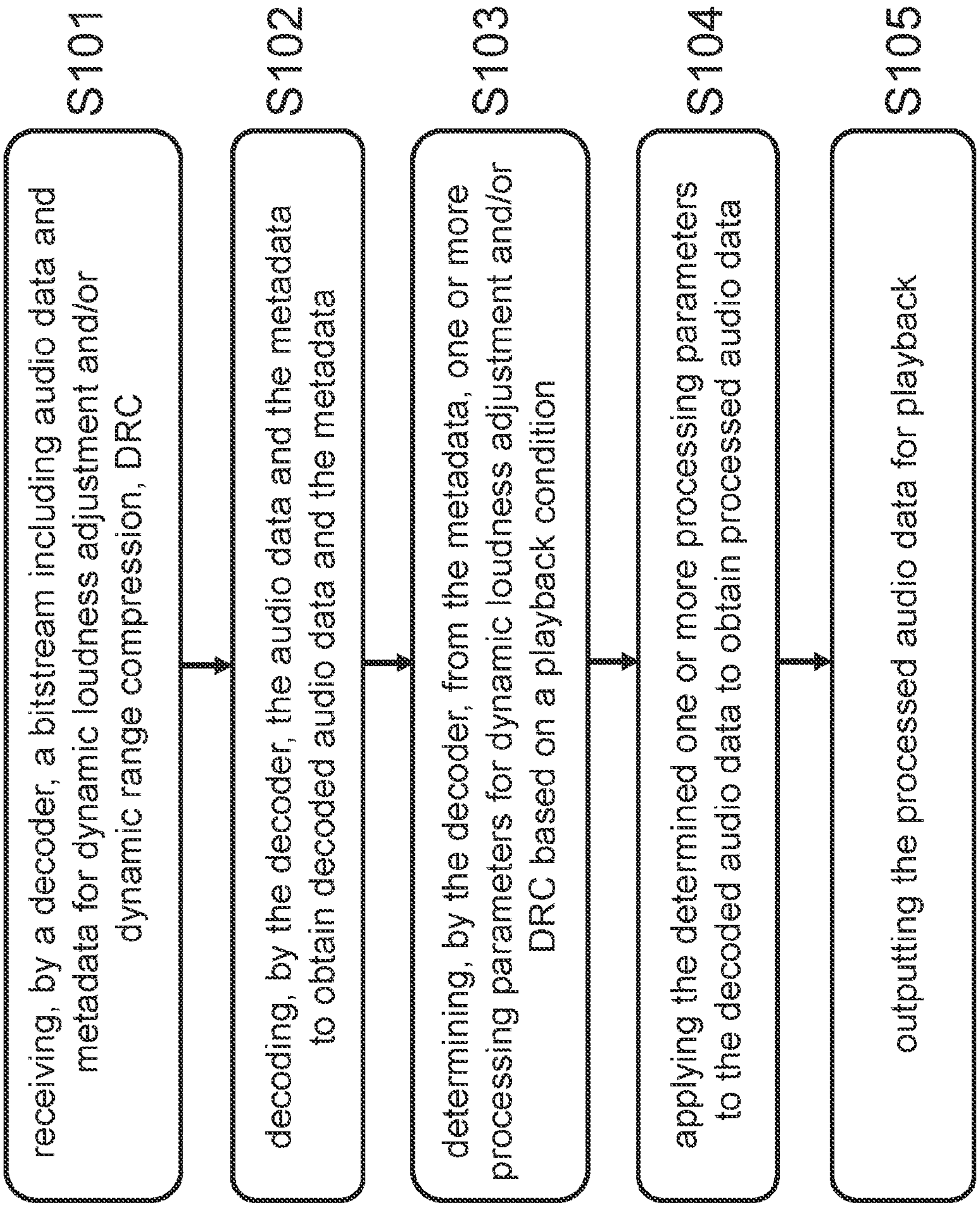
FIG. 2 illustrates an example of a method of metadata-based dynamic processing of audio data for playback.

Referring to the example of FIG. 2, in step S101 the decoder 100 may receive a bitstream including audio data and metadata for dynamic loudness adjustment and optionally, dynamic range compression (DRC). The audio data may be encoded audio data, the audio data may further be unprocessed. That is, the audio data may be said to be original audio data. The metadata may include a plurality of sets of metadata. For example, each payload of metadata may include such plurality of sets of metadata. These different sets of metadata may relate to respective playback conditions (e.g., to different playback conditions).

While the format of the bitstream is not limited, in an embodiment, the bitstream may be an MPEG-D DRC bitstream. The presence of metadata for dynamic processing of audio data may then be signaled based on MPEG-D DRC bitstream syntax. In an embodiment, a loudnessInfoSetExtension( )-element may be used to carry the metadata as a payload as detailed further below.

In step S102, the audio data and the metadata may then be decoded, by the decoder, to obtain decoded audio data and the metadata. In an embodiment, the metadata may include one or more processing parameters relating to average loudness values and optionally one or more processing parameters relating to dynamic range compression characteristics. It is understood that each set of metadata may include respective processing parameters.

The metadata allows to apply dynamic or real-time correction. For example, when encoding and decoding for live real-time playout, the application of the "real-time" or dynamic loudness metadata is desired to ensure that the live playout audio is properly loudness managed.

In step S103, the decoder then determines, from the metadata, one or more processing parameters for dynamic loudness adjustment based on a playback condition. This may be done by using the playback condition or information derived from the playback condition (e.g., playback condition information), to identify an appropriate set of metadata among the plurality of sets of metadata.

In an embodiment, a playback condition may include one or more of a device type of the decoder, characteristics of a playback device, characteristics of a loudspeaker, a loudspeaker setup, characteristics of background noise, characteristics of ambient noise and characteristics of the acoustic environment. Preferably, the playback condition information may be indicative of a specific loudspeaker setup. The consideration of a playback condition allows the decoder for a targeted selection of processing parameters for dynamic loudness adjustment with regard to device and environmental constraints.

In an embodiment, the process of determining the one or more processing parameters in step S103 may further include selecting, by the decoder, at least one of a set of DRC sequences, DRCSet, set of equalizer parameters, EQSet, and a downmix, corresponding to the playback condition. Thus, the at least one of a DRCSet, EQSet and downmix correlates with or is indicative of the individual device and environmental constraints due to the playback condition.

Preferably, step S103 involves selecting a set of DRC sequences, DRCSet. In other words, the selected set of metadata may include such set of DRC sequences.

In an embodiment, the process of determining in step S103 may further include identifying a metadata identifier indicative of the at least one selected DRCSet, EQSet and DownmixSet to determine the one or more processing parameters from the metadata. The metadata identifier thus enables to connect the metadata with a corresponding selected DRCSet, EQSet, and/or downmix, and thus with a respective playback condition.

In an embodiment, the specific loudspeaker setup may be used to determine a downmix, which in turn may be used for identifying and selecting an appropriate one among the plurality of sets of metadata. In such case, the specific loudspeaker setup and/or the downmix may be indicated by the aforementioned playback condition information.

In an embodiment, the metadata may comprise one or more metadata payloads (e.g., dynLoudComp( ) payloads, such as shown in Table 5 below), wherein each metadata payload may include a plurality of sets of parameters (e.g., parameters dynLoudCompValue) and identifiers, with each set including at least one of a DRCSet identifier, drcSetId, an EQSet identifier, eqSetId, and a downmix identifier, downmixId, in combination with one or more processing parameters relating to the identifiers in the set. That is, each payload may comprise an array of entries, each entry including processing parameters and identifiers (e.g., drcSetId, eqSetId, downmixId). The array of entries may correspond to the plurality of sets of metadata mentioned above. Preferably, each entry comprises the downmix identifier.

In a further embodiment, the determining in step S103 may thus involve selecting a set among the plurality of sets in the payload based on the downmix selected by the decoder (or alternatively, based on the at least one DRCSet, EQSet, and downmix), wherein the one or more processing parameters determined in step S103 may be the one or more processing parameters relating to the identifiers in the selected set. That is, depending on settings (e.g., DRCSet, EQSet, and downmix) present in the decoder, the decoder can search a given payload for an appropriate set of parameters and identifiers, by matching the aforementioned settings to the identifiers. The parameters included in the set whose identifiers best match the settings can then be selected as the processing parameters for dynamic loudness adjustment.

In step S104, the determined one or more processing parameters may then be applied, by the decoder, to the decoded audio data to obtain processed audio data. The processed audio data, for example live real-time audio data, are thus properly loudness managed.

In step S105, the processed audio data may then be output for playback.

In an embodiment, the bitstream may further include additional metadata for static loudness adjustment to be applied to the decoded audio data. Static loudness adjustment refers in contrast to dynamic processing for real-time situations to processing performed for general loudness normalization.

Carrying the metadata for dynamic processing separately from the additional metadata for general loudness normalization allows to not have the "real-time" correction applied.

For example, when encoding and decoding for live real-time playout, the application of dynamic processing is desired to ensure that the live playout audio is properly loudness managed. But for a non-real-time playout, or a transcoding where the dynamic correction is not desired or required, the dynamic processing parameters determined from the metadata do not have to be applied.

By further keeping the (dynamic/real-time) metadata for dynamic processing separate from the additional metadata, the originally unprocessed content can be retained, if desired. The original audio is encoded along with the metadata. This allows the playback device to selectively apply the dynamic processing and to further enable playback of original audio content on high-end devices capable of playing back original audio.

Keeping the dynamic loudness metadata distinct from the long-term loudness measurement/information, such as contentLoudness (in ISO/IEC 23003-4) as described above has some advantages. If combined, the loudness of the content (or what it should be after the dynamic loudness metadata is applied) would not indicate the actual loudness of the content, as the metadata available would be a composite value. Besides removing this ambiguity of what the content loudness (or program or anchor loudness) is, there are some cases where this would be particularly beneficial:

Keeping the metadata for dynamic processing separate allows the decoder or playback device to turn off the application of dynamic processing and to apply an implemented real-time loudness leveler instead to avoid cascading leveling. This situation may occur, for example, if the device's own real-time leveling solution is superior to the one used with the audio codec or, for example, if the device's own real-time leveling solution cannot be disabled and therefore will always be active, resolution in further processing leading to a compromised playback experience.

Keeping the metadata for dynamic processing separate further allows transcoding to a codec that does not support dynamic loudness processing and one wishes to apply their own loudness processing prior to re-encoding.

Live to broadcast, with a single encode for a live feed would be a further example. The dynamic processing metadata may be used or stored for archive or on-demand services. Therefore, for the archive or on-demand services, a more accurate, or compliant loudness measurement, based on the entire program can be carried out, and the appropriate metadata reset.

For use-cases where a fixed target loudness is used throughout the workflow, for example in a R128 compliant situation where −23 LKFS is recommended, this is also beneficial. In this scenario, the addition of the dynamic processing metadata is a "safety" measure, where the content is assumed and close to the required target and the addition of the dynamic processing metadata is a secondary check. Thus, having the ability to turn it off is desirable.

Encoding Audio Data and Metadata for Dynamic Loudness Adjustment

Figure 3:
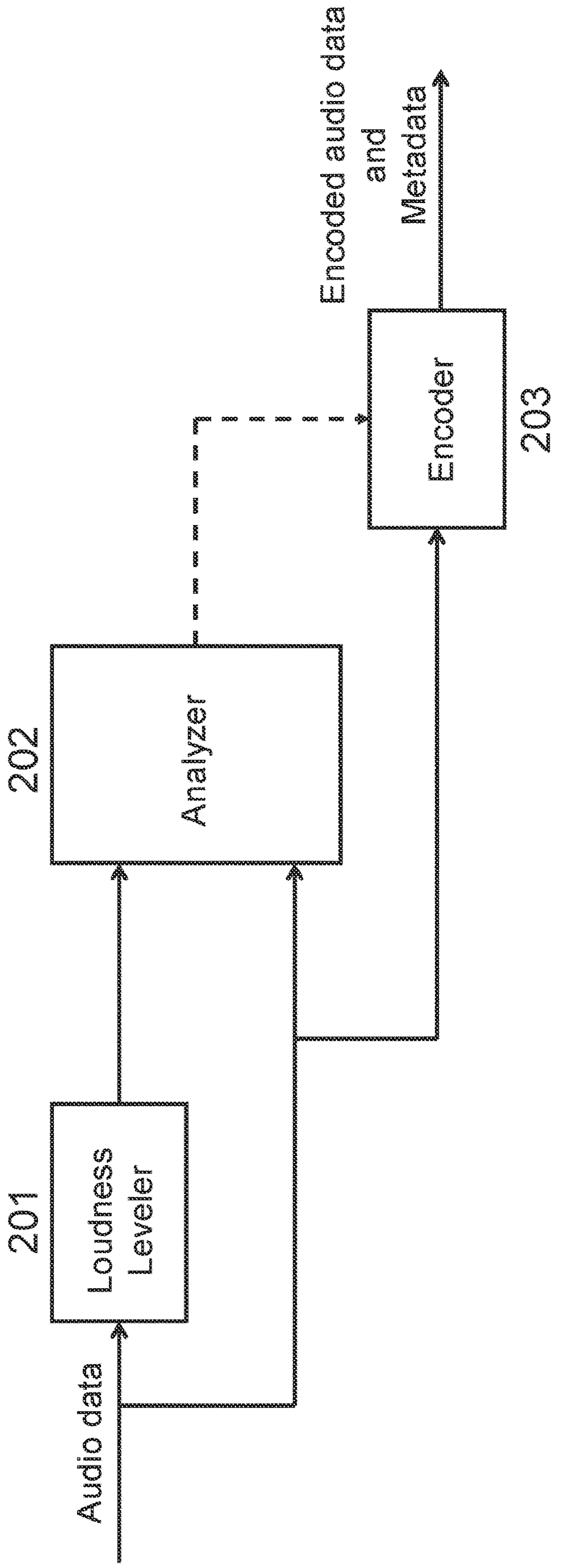
FIG. 3 illustrates an example of an encoder for encoding in a bitstream original audio data and metadata for dynamic loudness adjustment.
Figure 4:
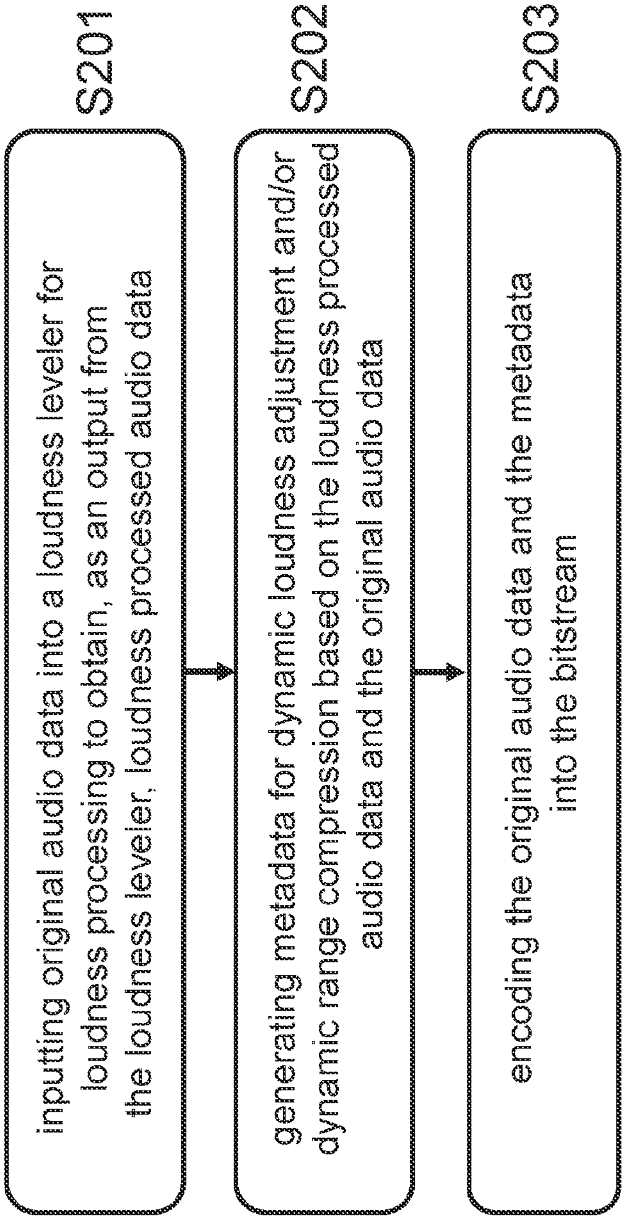
FIG. 4 illustrates an example of a method of encoding audio data and metadata for dynamic loudness adjustment, into a bitstream.

Referring to the examples of FIGS. 3 and 4, an encoder for encoding in a bitstream original audio data and metadata for dynamic loudness adjustment and optionally, dynamic range compression, DRC, is described which may comprise one or more processors and non-transitory memory configured to perform a method including the processes as illustrated in the steps in the example of FIG. 4.

In step S201, original audio data may be input into a loudness leveler, 201, for loudness processing to obtain, as an output from the loudness leveler, 201, loudness processed audio data.

In step S202, metadata for dynamic loudness adjustment may then be generated based on the loudness processed audio data and the original audio data. Appropriate smoothing and time frames may be used to reduce artifacts.

In an embodiment, step S202 may include comparison of the loudness processed audio data to the original audio data, by an analyzer, 202, wherein the metadata may be generated based on a result of said comparison. The metadata thus generated can emulate the effect of the leveler at the decoder site. The metadata may include:

- Gain (wideband and/or multiband) processing parameters such that when applied to the original audio will produced loudness compliant audio for playback;
- Processing parameters describing the dynamics of the audio such as
  - Peak—sample and true peak
  - Short-term loudness values
  - Change of short-term loudness values.

In an embodiment, step S202 may further include measuring, by the analyzer, 202, the loudness over one or more pre-defined time periods, wherein the metadata may be generated further based on the measured loudness. In an embodiment, the measuring may comprise measuring overall loudness of the audio data. Alternatively, or additionally, in an embodiment, the measuring may comprise measuring loudness of dialogue in the audio data.

In step S203, the original audio data and the metadata may then be encoded into the bitstream. While the format of the bitstream is not limited, in an embodiment, the bitstream may be an MPEG-D DRC bitstream and the presence of the metadata may be signaled based on MPEG-D DRC bitstream syntax. In this case, in an embodiment, a loudnessInfoSetExtension( )-element may be used to carry the metadata as a payload as detailed further below.

In an embodiment, the metadata may comprise one or more metadata payloads, wherein each metadata payload may include a plurality of sets of parameters and identifiers, with each set including at least one of a DRCSet identifier, drcSetId, an EQSet identifier, eqSetId, and a downmix identifier, downmixId, in combination with one or more processing parameters relating to the identifiers in the set, and wherein the one or more processing parameters may be parameters for dynamic loudness adjustment by a decoder. In this case, in an embodiment, the at least one of the drcSetId, the eqSetId, and the downmixId may be related to at least one of a set of DRC sequences, DRCSet, a set of equalizer parameters, EQSet, and a downmix, to be selected by the decoder. In general, the metadata may be said to include a plurality of sets of metadata, with each set corresponding to a respective playback condition (e.g., to a different playback condition).

In an embodiment, the method may further include generating additional metadata for static loudness adjustment to be used by a decoder. Keeping the metadata for dynamic loudness processing and the additional metadata separate in the bitstream and encoding further the original audio data into the bitstream has several advantages as detailed above.

Figure 5:
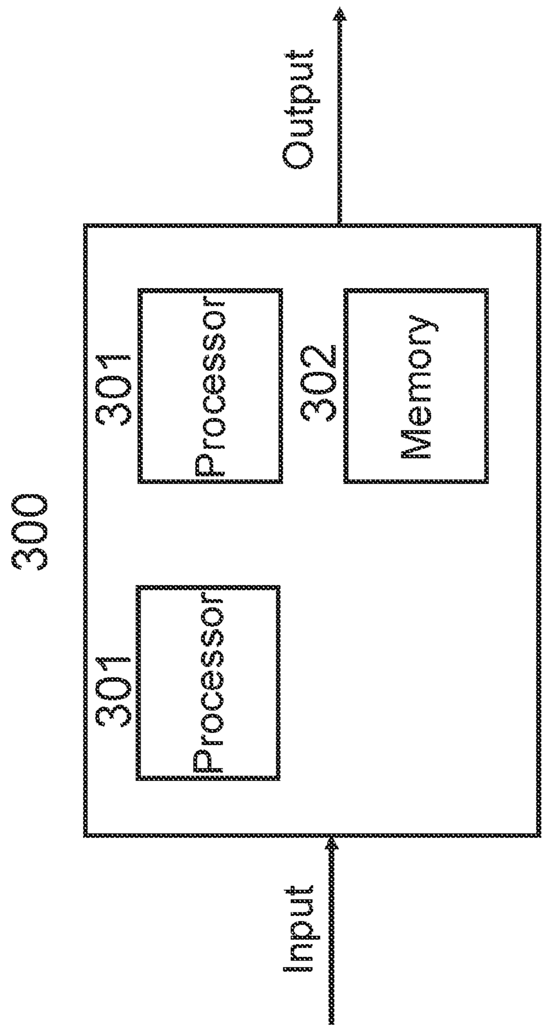
FIG. 5 illustrates an example of a device comprising one or more processors and non-transitory memory configured to perform the methods described herein.

The methods described herein may be implemented on a decoder or an encoder, respectively, wherein the decoder and the encoder may comprise one or more processors and non-transitory memory configured to perform said methods. An example of a device having such processing capability is illustrated in the example of FIG. 5 showing said device, 300, including two processors, 301, and non-transitory memory, 302.

It is noted that the methods described herein can further be implemented on a system of an encoder for encoding in a bitstream original audio data and metadata for dynamic loudness adjustment and optionally, dynamic range compression, DRC, and a decoder for metadata-based dynamic processing of audio data for playback as described herein.

The methods may further be implemented as a computer program product comprising a computer-readable storage medium with instructions adapted to cause the device to carry out said methods when executed by a device having processing capability. The computer program product may be stored on a computer-readable storage medium.

MPEG-D DRC Modified Bitstream Syntax

In the following, it will be described how the MPEG-D DRC bitstream syntax, as described in ISO/IEC 23003-4, may be modified in accordance with embodiments described herein.

The MPEG-D DRC syntax may be extended, e.g. the loudnessInfoSetExtension( )-element shown in Table 2 below, in order to also carry the dynamic processing metadata as a frame-based dynLoudComp update.

For example, another switch-case UNIDRCLOUDEXT_DYNLOUDCOMP may be added in the loudnessInfoSetExtension( )-element as shown in Table 1. The switch-case UNIDRCLOUDEXT_DYNLOUDCOMP may be used to identify a new element dynLoudComp( ) as shown in Table 5. The loudnessInfoSetExtension( )-element may be an extension of the loudnessInfoSet( )-element as shown in Table 2. Further, the loudnessInfoSet( )-element may be part of the uniDRC( )-element as shown in Table 3.

TABLE 1

| Syntax of loudnessInfoSetExtension( )-element | | |
|---|---|---|
| **Syntax** | **No. of bits** | **Mnemonic** |
| loudnessInfoSetExtension( ) | | |
| { | | |
|   while (loudnessInfoSetExtType != UNIDRCLOUDEXT__TERM) { | 4 | uimsbf |
|     extSizeBits = bitSizeLen + 4; | 4 | uimsbf |
|     extBitSize = bitSize + 1; | extSizeBits | uimsbf |
|     switch (loudnessInfoSetExtType) { | | |
|       UNIDRCLOUDEXT__EQ: | | |
|         loudnessInfoV1AlbumCount; | 6 | uimsbf |
|         loudnessInfoV1Count; | 6 | uimsbf |
|         for (i=0; i<loudnessInfoV1AlbumCount; i++) { | | |
|           loudnessInfoV1( ); | | |
|         } | | |
|         for (i=0; i<loudnessInfoV1 Count; i++) { | | |
|           loudnessInfoV1( ); | | |
|         } | | |
|         break; | | |
|       UNIDRCLOUDEXT__DYNLOUDCOMP: | | |
|         dynLoudCompCount; | 6 | uimsbf |
|         for (i=0; i<dynLoudCompCount; i++) { | | |
|           dynLoudComp( ); | | |
|         } | | |
|         break; | | |
|       /* add future extensions here */ | | |
|       default: | | |
|         for (i=0; i<extBitSize; i++) { | | |
|         otherBit; | 1 | bslbf |
|       } | | |
|     } | | |
|   } | | |
| } | | |

TABLE 2

| Syntax of loudnessInfoSet( )-element | | |
|---|---|---|
| **Syntax** | **No. of bits** | **Mnemonic** |
| loudnessInfoSet( ) | | |
| { | | |
|   loudnessInfoAlbumCount; | 6 | uimsbf |
|   loudnessInfoCount; | 6 | uimsbf |
|   for (i=0; i<loudnessInfoAlbumCount; i++) { | | |
|     loudnessInfo( ); | | |
|   } | | |
|   for (i=0; i<loudnessInfoCount; i++) { | | |
|     loudnessInfo( ); | | |
|   } | | |
|   loudnessInfoSetExtPresent; | 1 | bslbf |
|   if(loudnessInfoSetExtPresent==1) { | | |
|     loudnessInfoSetExtension( ); | | |
|   } | | |
| } | | |

TABLE 3

| Syntax of uniDRC( )-element | | |
|---|---|---|
| **Syntax** | **No. of bits** | **Mnemonic** |
| uniDrc( ) | | |
| { | | |
|   uniDrcLoudnessInfoSetPresent; | 1 | bslbf |
|   if(uniDrcLoudnessInfoSetPresent==1) { | | |
|     uniDrcConfigPresent; | 1 | bslbf |
|     if(uniDrcConfigPresent == 1) { | | |
|       uniDrcConfig( ); | | |
|     } | | |
|     loudnessInfoSet( ); | | |
|   } | | |
|   uniDrcGain( ); | | |
| } | | |

TABLE 4

| loudnessInfoSet extension types | | |
|---|---|---|
| **Symbol** | **Value of loudnessInfoSetExtType** | **Purpose** |
| UNIDRCLOUDEXT_TERM | 0 × 0 | Termination tag |
| UNIDRCLOUDEXT_EQ | 0 × 1 | Extension for equalization |
| UNIDRCLOUDEXT_DYNLOUDCOMP | 0 × 2 | Extension for dynamic processing |
| (reserved) | (All remaining values) | For future use |

New dynLoudComp( ):

TABLE 5

| Syntax of dynLoudComp( )-element | | |
|---|---|---|
| Syntax | No. of bits | Mnemonic |
| dynLoudComp( ) | | |
| { | | |
| dynLoudCompPresent = 1 | | |
| drcSetId; | 6 | uimsbf |
| eqSetId; | 6 | uimsbf |
| downmixId; | 7 | uimsbf |
| dynLoudCompValue; | 10 | uimsbf |
| } | | |

The drcSetId enables dynLoudComp (relating to the metadata) to be applied per DRC-set.

The eqSetId enables dynLoudComp to be applied in combination with different settings for the equalization tool.

The downmixId enables dynLoudComp to be applied per DownmixID.

In some cases, in addition to the above parameters, it may be beneficial for the dynLoudComp( ) element to also include a methodDefinition parameter (specified by, e.g., 4 bits) specifying a loudness measurement method used for deriving the dynamic program loudness metadata (e.g., anchor loudness, program loudness, short-term loudness, momentary loudness, etc.) and/or a measurementSystem parameter (specified by, e.g., 4 bits) specifying a loudness measurement system used for measuring the dynamic program loudness metadata (e.g., EBU R.128, ITU-R BS-1770 with or without preprocessing, ITU-R BS-1771, etc.). Such parameters may, e.g., be included in the dynLoudComp( ) element between the downmixId and dynLoudCompValue parameters.

Alternative Syntax 1

TABLE 6

| Syntax of loudnessInfoSetExtension( )-element | | |
|---|---|---|
| Syntax | No. of bits | Mnemonic |
| loudnessInfoSetExtension( ) | | |
| { | | |
| while (loudnessInfoSetExtType != UNIDRCLOUDEXT_TERM) { | 4 | uimsbf |
| extSizeBits = bitSizeLen + 4; | 4 | uimsbf |
| extBitSize = bitSize + 1; | extSizeBits | uimsbf |
| switch (loudnessInfoSetExtType) { | | |
| UNIDRCLOUDEXT_EQ: | | |
| loudnessInfoV1AlbumCount; | 6 | uimsbf |
| loudnessInfoV1Count; | 6 | uimsbf |
| for (i=0; i<loudnessInfoV1AlbumCount; i++) { | | |
| loudnessInfoV1( ); | | |
| } | | |
| for (i=0; i<loudnessInfoV1 Count; i++) { | | |
| loudnessInfoV1( ); | | |
| } | | |
| break; | | |
| UNIDRCLOUDEXT_DYNLOUDCOMP: | | |
| loudnessInfoV2Count; | 6 | uimsbf |
| for (i=0; i<loudnessInfoV2Count; i++) { | | |
| loudnessInfoV2( ); | | |
| } | | |
| break; | | |
| /* add future extensions here */ | | |
| default: | | |
| for (i=0; i<extBitSize; i++) { | | |
| otherBit; | 1 | bslbf |
| } | | |
| } | | |
| } | | |
| } | | |

TABLE 7

| loudnessInfoSet extension types | | |
|---|---|---|
| Symbol | Value of loudnessInfoSetExtType | Purpose |
| UNIDRCLOUDEXT_TERM | 0 × 0 | Termination tag |
| UNIDRCLOUDEXT_EQ | 0 × 1 | Extension for equalization |
| UNIDRCLOUDEXT_DYNLOUDCOMP | 0 × 2 | Extension for dynamic processing |
| (reserved) | (All remaining values) | For future use |

TABLE 8

Syntax of loudnessInfoV2( ) payload

| Syntax | No. of bits | Mnemonic |
|---|---|---|
| loudnessInfoV2( ) | | |
| { | | |
| drcSetId; | 6 | uimsbf |
| eqSetId; | 6 | uimsbf |
| downmixId; | 7 | uimsbf |
| samplePeakLevelPresent; | 1 | bslbf |
| if(samplePeakLevelPresent==1) { | | |
| bsSamplePeakLevel; | 12 | uimsbf |
| } | | |
| truePeakLevelPresent; | 1 | bslbf |
| if(truePeakLevelPresent==1) { | | |
| bsTruePeakLevel; | 12 | uimsbf |
| measurementSystem; | 4 | uimsbf |
| reliability; | 2 | uimsbf |
| } | | |
| measurementCount; | 4 | uimsbf |
| for (i=0; i<measurementCount; i++) { | | |
| methodDefinition; | 4 | uimsbf |
| methodValue; | 2 . . . 8 | vlclbf |
| measurementSystem; | 4 | uimsbf |
| reliability; | 2 | uimsbf |
| } | | |
| dynLoudCompPresent; | 1 | bslbf |
| if(dynLoudCompPresent==1) { | | |
| dynLoudCompValue; | 10 | uimsbf |
| } | | |
| } | | |

In some cases, it may be beneficial to modify the syntax shown above in Table 8 such that the dynLoudCompPresent and (if dynLoudCompPresent==1) dynLoudCompValue parameters follow the reliability parameter within the measurementCount loop of the loudnessInfoV2( ) payload, rather than being outside the measurementCount loop. Furthermore, it may also be beneficial to set dynLoudCompValue equal to 0 in cases where dynLoudCompPresent is 0.

Alternative Syntax 2

Alternatively, the dynLoudComp( )-element could be placed into the uniDrcGainExtension( )-element.

TABLE 9

Syntax of uniDrcGain( )-element

| Syntax | No. of bits | Mnemonic |
|---|---|---|
| uniDrcGain( ) | | |
| { | | |
| nDrcGainSequences = gainSequenceCount; | | |
| /* from drcCoefficientsUniDrc or drcCoefficientsUniDrc V1 */ | | |
| for (s=0; s<nDrcGainSequences; s++) { | | |
| if(gainCodingProfile[s]<3) { | | |
| drcGainSequence( ); | | |
| } | | |
| } | | |
| uniDrcGainExtPresent; | 1 | bslbf |
| if(uniDrcGainExtPresent==1) { | | |
| uniDrcGainExtension( ); | | |
| } | | |
| } | | |

TABLE 10

Syntax of uniDrcGainExtension( )-element

| Syntax | No. of bits | Mnemonic |
|---|---|---|
| uniDrcGainExtension( ) | | |
| { | | |
| while (uniDrcGainExtType != UNIDRCGAINEXT_TERM) { | 4 | uimsbf |
| extSizeBits = bitSizeLen + 4; | 3 | uimsbf |
| extBitSize = bitSize + 1; | extSizeBits | uimsbf |
| switch (uniDrcGainExtType) { | | |
| UNIDRCLOUDEXT_DYNLOUDCOMP: | | |
| dynLoudCompCount; | 6 | uimsbf |
| for (i=0; i<dynLoudCompCount; i++) { | | |
| dynLoudComp( ); | | |
| } | | |
| break; | | |
| /* add future extensions here */ | | |
| default: | | |
| for (i=0; i<extBitSize; i++) { | | |
| otherBit; | 1 | bslbf |
| } | | |
| } | | |
| } | | |
| } | | |

TABLE 11

| UniDrc gain extension types | | |
|---|---|---|
| Symbol | Value of uniDrcGainExtType | Purpose |
| UNIDRCGAINEXT_TERM | 0 × 0 | Termination tag |
| UNIDRCGAINEXT_DYNLOUDCOMP | 0 × 1 | Extension for dynamic processing |
| (reserved) | (All remaining values) | For future use |

Semantics

| | |
|---|---|
| dynLoudCompValue | This field contains the value for dynLoudCompDb. The values are encoded according to the table below. The default value is 0 dB. |

TABLE 12

| Coding of dynLoudCompValue field | | | | |
|---|---|---|---|---|
| Encoding | Size | Mnemonic | Value in [dB] | Approximate range |
| μ | 10 bits | uimsbf | dynLoudCompDb = $-16 + \mu 2^{-5}$ | −16 . . . 16 dB, 0.0312 dB step size |

Updated MPEG-D DRC Loudness Normalization Processing

TABLE 13

Loudness normalization processing

```
if(targetLoudnessPresent) {
  if(dynLoudCompPresent) {
```

TABLE 13-continued

Loudness normalization processing

```
    loudnessNormalizationGainDb = targetLoudness −
contentLoudness + dynLoudCompDb;
  } else {
    loudnessNormalizationGainDb = targetLoudness − contentLoudness;
  }
} else {
  loudnessNormalizationGainDb = 0.0;
}
if (loudnessNormalizationGainDbMaxPresent) {
  loudnessNormalizationGainDb = min(loudnessNormalizationGainDb,
loudnessNormalizationGainDbMax);
}
if (loudnessNormalizationGainModificationDbPresent) {
  gainNorm = pow(2.0, (loudnessNormalizationGainDb +
loudnessNormalizationGainModificationDb) / 6);
} else {
  gainNorm = pow(2.0, loudnessNormalizationGainDb / 6);
}
for (t=0; t<drcFrameSize; t++) {
  for (c=0; c<nChannels; c++) {
    audioSample[c][t] = gainNorm * audioSample[c][t];
  }
}
```

Pseudo-Code for Selection and Processing of dynLoudComp

```
/* Selection Process */
/* The following settings would be derived from user/decoder settings
drcSetId = 1;
eqSetID = 2;
downmixId = 3;
*/
findMatchingDynLoudComp (drcSetId, eqSetID, downmixId) {
  dynLoudComp = UNDEFINED;
  /* Check if matching loudnessInfo set is present */
  if (targetLoudnessPresent(drcSetId, eqSetID, downmixId)) continue;
  else {
    dynLoudCompPresent = false;
    exit(0);
  }
  /* If all values are defined */
  if (drcSetId != UNDEFINED && eqSetID != UNDEFINED && downmixId !=
UNDEFINED) {
    for (num=0; num<num_of_dynLoudCompValues; num++) {
        if (dynLoudCompArray[num].drcSetId == drcSetId &&
          dynLoudCompArray [num].eqSetID == eqSetID &&
          dynLoudCompArray[num].downmixId == downmixId) {
          /* Correct entry found, assign to dynLoudComp */
          dynLoudComp = dynLoudCompArray[num].dynLoudCompValue;
        }
    }
  }
  else if (drcSetId == UNDEFINED) {
    for (num=0; num<num_of_dynLoudCompValues; num++) {
        if (dynLoudCompArray[num].eqSetID == eqSetID &&
```

-continued

```
                dynLoudCompArray[num].downmixId == downmixId) {
                /* Correct entry found, assign to dynLoudComp */
                dynLoudComp = dynLoudCompArray[num].dynLoudCompValue;
            }
        }
    }
    else if (eqSetID == UNDEFINED) {
        for (num=0; num<num_of_dynLoudComp Values; num++) {
            if (dynLoudCompArray[num].drcSetId == drcSetId &&
                dynLoudCompArray[num].downmixId == downmixId) {
                /* Correct entry found, assign to dynLoudComp */
                dynLoudComp = dynLoudCompArray[num].dynLoudComp Value;
            }
        }
    }
    else if (downmixId == UNDEFINED) {
        for (num=0; num<num_of_dynLoudCompValues; num++) {
            if (dynLoudCompArray[num].drcSetId == drcSetId &&
                dynLoudCompArray[num].eqSetID == eqSetID) {
                /* Correct entry found, assign to dynLoudComp */
                dynLoudComp = dynLoudCompArray[num].dynLoudComp Value;
            }
        }
    }
    else if (drcSetId == UNDEFINED && downmixId == UNDEFINED) {
        for (num=0; num<num_of_dynLoudCompValues; num++) {
            if (dynLoudCompArray[num].eqSetID == eqSetID) {
                /* Correct entry found, assign to dynLoudComp */
                dynLoudComp = dynLoudCompArray[num].dynLoudCompValue;
            }
        }
    }
    else if (drcSetId == UNDEFINED && eqSetID == UNDEFINED) {
        for (num=0; num<num_of_dynLoudCompValues; num++) {
            if (dynLoudCompArray[num].downmixId == downmixId) {
                /* Correct entry found, assign to dynLoudComp */
                dynLoudComp = dynLoudCompArray[num].dynLoudCompValue;
            }
        }
    }
    else if (eqSetID == UNDEFINED && downmixId == UNDEFINED) {
        for (num=0; num<num_of_dynLoudComp Values; num++) {
            if (dynLoudCompArray[num].eqSetID == eqSetID) {
                /* Correct entry found, assign to dynLoudComp */
                dynLoudComp = dynLoudCompArray[num].dynLoudCompValue;
            }
        }
    }
    if (dynLoudComp == UNDEFINED){
        dynLoudCompPresent = false;
        exit(1);
    }
    else {
        dynLoudCompPresent = true;
        exit(0);
    }
}
/* Processing */
if (targetLoudnessPresent) {
        if (dynLoudCompPresent) {
    loudnessNormalizationGainDb = targetLoudness − contentLoudness + dynLoudCompDb;
  } else {
    loudnessNormalizationGainDb = targetLoudness − contentLoudness;
  }
} else {
  loudnessNormalizationGainDb = 0.0;
}
  if (loudnessNormalizationGainDbMaxPresent) {
  loudnessNormalizationGainDb = min(loudnessNormalizationGainDb,
loudnessNormalizationGainDbMax);
}
if (loudnessNormalizationGainModificationDbPresent) {
  gainNorm = pow(2.0, (loudnessNormalizationGainDb +
loudnessNormalizationGainModificationDb) / 6);
} else {
  gainNorm = pow(2.0, loudnessNormalizationGainDb / 6);
}
```

-continued

```
for (t=0; t<drcFrameSize; t++) {
   for (c=0; c<nChannels; c++) {
      audioSample[c][t] = gainNorm * audioSample[c][t];
   }
}
```

In some cases, in addition to the selection process shown in pseudo-code above (e.g., taking drcSetId, eqSetID and downmixId into consideration for selecting a dynLoudCompValue parameter), it may be beneficial for the selection process to also take a methodDefinition parameter and/or a measurementSystem parameter into consideration for selecting a dynLoudCompValue parameter.

Alternative Updated MPEG-D DRC Loudness Normalization Processing

TABLE 14

Alternative Loudness normalization processing

```
if (targetLoudnessPresent) {
   loudnessNormalizationGainDb = targetLoudness - contentLoudness + dynLoudCompDb;
}
else {
   loudnessNormalizationGainDb = 0.0;
}
if (loudnessNormalizationGainDbMaxPresent) {
   loudnessNormalizationGainDb = min(loudnessNormalizationGainDb,
loudnessNormalizationGainDbMax);
}
if (loudnessNormalizationGainModificationDbPresent) {
   gainNorm = pow(2.0, (loudnessNormalizationGainDb +
loudnessNormalizationGainModificationDb) / 6);
} else {
   gainNorm = pow(2.0, loudnessNormalizationGainDb / 6);
}
for (t=0; t<drcFrameSize; t++) {
   for (c=0; c<nChannels; c++) {
      audioSample[c][t] = gainNorm * audioSample[c][t];
   }
}
```

In cases where the alternative loudness normalization processing of Table 14 above is used, the loudness normalization processing pseudo-code described above may be replaced by the following alternative loudness normalization processing pseudo-code. Note that a default value of dynLoudCompDb, e.g., 0 dB, may be assumed to ensure that the value of dynLoudCompDb is defined, even for cases where dynamic loudness processing metadata is not present in the bitstream.

```
/* Alternative Processing */
if (targetLoudnessPresent) {
   loudnessNormalizationGainDb = targetLoudness - contentLoudness +
   dynLoudCompDb;
}
else {
   loudnessNormalizationGainDb = 0.0;
}
   if (loudnessNormalizationGainDbMaxPresent) {
   loudnessNormalizationGainDb = min(loudnessNormalizationGainDb,
loudnessNormalizationGainDbMax);
}
```

-continued

```
if (loudnessNormalizationGainModificationDbPresent) {
   gainNorm = pow(2.0, (loudnessNormalizationGainDb +
loudnessNormalizationGainModificationDb) / 6);
} else {
   gainNorm = pow(2.0, loudnessNormalizationGainDb / 6);
}
for (t=0; t<drcFrameSize; t++) {
   for (c=0; c<nChannels; c++) {
      audioSample[c][t] = gainNorm * audioSample[c][t];
   }
}
```

Alternative Syntax 3

In some cases, it may be beneficial to combine the syntax described above in Table 1-Table 5 with Alternative Syntax 1 described above in Table 6-Table 8, as shown in the following Tables, to allow increased flexibility for transmission of the dynamic loudness processing values.

TABLE 15

| Alternate Syntax 3 of loudnessInfoSetExtension( )-element | | |
|---|---|---|
| Syntax | No. of bits | Mnemonic |
| loudnessInfoSetExtension( ) | | |
| { | | |
| while (loudnessInfoSetExtType != UNIDRCLOUDEXT__TERM) { | 4 | uimsbf |
| extSizeBits = bitSizeLen + 4; | 4 | uimsbf |
| extBitSize = bitSize + 1; | extSizeBits | uimsbf |
| switch (loudnessInfoSetExtType) { | | |
| UNIDRCLOUDEXT__EQ: | | |
| loudnessInfoV1AlbumCount; | 6 | uimsbf |
| loudnessInfoV1Count; | 6 | uimsbf |
| for (i=0; i<loudnessInfoV1AlbumCount; i++) { | | |
| loudnessInfoV1( ); | | |
| } | | |
| for (i=0; i<loudnessInfoV1 Count; i++) { | | |
| loudnessInfoV1( ); | | |
| } | | |
| break; | | |
| UNIDRCLOUDEXT__DYNLOUDCOMP: | | |
| loudnessInfoV2Count; | 6 | uimsbf |
| for (i=0; i< loudnessInfoV2Count; i++) { | | |
| loudnessInfoV2( ); | | |
| } | | |
| break; | | |
| UNIDRCLOUDEXT__DYNLOUDCOMP2: | | |
| dynLoudCompCount; | 6 | uimsbf |
| for (i=0; i<dynLoudCompCount; i++) { | | |
| dynLoudComp( ); | | |
| } | | |
| break; | | |
| /* add future extensions here */ | | |
| default: | | |
| for (i=0; i<extBitSize; i++) { | | |
| otherBit; | 1 | bslbf |
| } | | |
| } | | |
| } | | |
| } | | |

TABLE 16

| Alternate Syntax 3 of loudnessInfoSet extension types | | |
|---|---|---|
| Symbol | Value of loudnessInfoSetExtType | Purpose |
| UNIDRCLOUDEXT_TERM | 0 × 0 | Termination tag |
| UNIDRCLOUDEXT_EQ | 0 × 1 | Extension for equalization |
| UNIDRCLOUDEXT_DYNLOUDCOMP | 0 × 2 | Extension for dynamic processing |
| UNIDRCLOUDEXT_DYNLOUDCOMP2 | 0 × 3 | Extension for dynamic processing |
| (reserved) | (All remaining values) | For future use |

TABLE 17

| Alternate Syntax 3 of loudnessInfoV2( ) payload | | |
|---|---|---|
| Syntax | No. of bits | Mnemonic |
| loudnessInfoV2( ) | | |
| { | | |
| drcSetId; | 6 | uimsbf |
| eqSetId; | 6 | uimsbf |
| downmixId; | 7 | uimsbf |
| samplePeakLevelPresent; | 1 | bslbf |
| if (samplePeakLevelPresent==1) { | | |
| bsSamplePeakLevel; | 12 | uimsbf |
| } | | |
| truePeakLevelPresent; | 1 | bslbf |
| if (truePeakLevelPresent==1) { | | |

TABLE 17-continued

| Alternate Syntax 3 of loudnessInfoV2( ) payload | | |
|---|---|---|
| Syntax | No. of bits | Mnemonic |
| bsTruePeakLevel; | 12 | uimsbf |
| measurementSystem; | 4 | uimsbf |
| reliability; | 2 | uimsbf |
| } | | |
| measurementCount; | 4 | uimsbf |
| for (i=0; i<measurementCount; i++) { | | |
| methodDefinition; | 4 | uimsbf |
| methodValue; | 2 . . . 8 | vlclbf |
| measurementSystem; | 4 | uimsbf |
| reliability; | 2 | uimsbf |

TABLE 17-continued

| Alternate Syntax 3 of loudnessInfoV2( ) payload | | |
|---|---|---|
| Syntax | No. of bits | Mnemonic |
| dynLoudCompPresent; | 1 | uimbsf |
| if (dynLoudCompPresent==1) { | | |
| dynLoudCompValue; | 10 | uimsbf |
| } | | |
| else { | | |
| dynLoudCompValue=0; | | |
| } | | |
| } | | |
| } | | |

Alternate Syntax 3 of dynLoudComp( )

TABLE 18

| Alternate Syntax 3 of dynLoudComp( )-element | | |
|---|---|---|
| Syntax | No. of bits | Mnemonic |
| dynLoudComp( ) | | |
| { | | |
| dynLoudCompPresent = 1 | | |
| drcSetId; | 6 | uimsbf |

TABLE 18-continued

| Alternate Syntax 3 of dynLoudComp( )-element | | |
|---|---|---|
| Syntax | No. of bits | Mnemonic |
| eqSetId; | 6 | uimsbf |
| downmixId; | 7 | uimsbf |
| methodDefinition; | 4 | uimsbf |
| measurementSystem; | 4 | uimsbf |
| dynLoudCompValue; | 10 | uimsbf |
| } | | |

Interface Extension Syntax

In some cases, it may be beneficial to allow control, e.g., by an end user, of whether or not dynamic loudness processing is performed, even when dynamic loudness processing information is present in a received bitstream. Such control may be provided by updating the MPEG-D DRC interface syntax to include an additional interface extension (e.g., UNIDRCINTERFACEEXT_DYNLOUD) which contains a revised loudness normalization control interface payload (e.g., loudnessNormalizationControlInterfaceV1( )) as shown in the following tables.

TABLE 19

| Syntax of uniDRCInterfaceExtension( ) payload | | |
|---|---|---|
| Syntax | No. of bits | Mnemonic |
| uniDrcInterface Extension( | | |
| { | | |
| while (uniDrcInterfaceExtType!=UNIDRCINTERFACEEXT__TERM) { | 4 | uimsbf |
| extSizeBits = bitSizeLen + 4; | 4 | uimsbf |
| extBitSize = bitSize + 1; | extSizeBits | uimsbf |
| switch (uniDrcInterfaceExtType) { | | |
| UNIDRCINTERFACEEXT__EQ: | | |
| loudnessEqParameterInterfacePresent; | 1 | bslbf |
| if (loudnessEqParameterInterfacePresent==1) { | | |
| loudnessEqParameterInterface( ); | | |
| } | 1 | |
| equalizationControlInterfacePresent; | | bslbf |
| if (equalizationControlInterfacePresent==1) { | | |
| equalizationControlInterface( ); | | |
| } | | |
| break; | | |
| UNIDRCINTERFACEEXT__DYNLOUD: | | |
| loudnessNormalizationControlInterfaceV10; | | |
| break; | | |
| /* add future extensions here */ | | |
| default: | | |
| for (i=0; i<extBitSize; i++) { | | |
| otherBit; | 1 | bslbf |
| } | | |
| } | | |
| } | | |
| } | | |

TABLE 20

Syntax of loudnessNormalizationControlInterfaceV1( ) payload

| Syntax | No. of bits | Mnemonic |
|---|---|---|
| loudnessNormalizationControlInterfaceV1() | | |
| { | | |
| loudnessNormalizationOn; | 1 | bslbf |
| if (loudnessNormalizationOn == 1) { | | |
| targetLoudness; | 12 | uimsbf |
| dynLoudnessNormalizationOn; | 1 | bslbf |
| } | | |
| } | | |

TABLE 21

UniDRC Interface extension types

| Symbol | Value of uniDRCInterfaceExtType | Purpose |
|---|---|---|
| UNIDRCINTERFACEEXT_TERM | 0 × 0 | Termination tag |
| UNIDRCINTERFACEEXT_EQ | 0 × 1 | Equalization Control |
| UNIDRCINTERFACEEXT_DYNLOUD | 0 × 2 | Dynamic Loudness Control |
| (reserved) | (All remaining values) | For future use |

Interface Extension Semantics

| | |
|---|---|
| loudnessNormalizationOn | This flag signals if loudness normalization processing should be switched on or off. The default value is 0. If loudnessNormalizationOn == 0, loudnessNormalizationGainDb shall be set to 0 dB. |
| targetLoudness | This field contains the desired output loudness. The values are encoded according to the following Table. |

TABLE 22

Coding of targetLoudness field

| Encoding | Size | Mnemonic | Value in [dB] | Approximate range |
|---|---|---|---|---|
| μ | 12 bits | uimsbf | $L_{TL} = -\mu 2^{-5}$ | −128 . . . 0 dB, 0.0312 dB step size |

| | |
|---|---|
| dynLoudnessNormalizationOn | This flag signals if dynamic loudness normalization processing should be switched on or off. The default value is 0. If dynLoudnessNormalizationOn == 0, dynloudnessNormalizationGainDb shall be set to 0 dB. |

Interpretation

Unless specifically stated otherwise, as apparent from the following discussions, it is appreciated that throughout the disclosure discussions utilizing terms such as "processing", "computing", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one embodiment", "some embodiments" or "an example embodiment" means that a particular feature, structure or characteristic described in connection with the embodiment is included in at least one embodiment of the present disclosure. Thus, appearances of the phrases "in one embodiment", "in some embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

In the following, enumerated example embodiments (EEEs) describe some structures, features, and functionalities of some aspects of the example embodiments disclosed herein.

EEE1. A method of metadata-based dynamic processing of audio data for playback, the method including processes of:
- (a) receiving, by a decoder, a bitstream including audio data and metadata for dynamic loudness adjustment;
- (b) decoding, by the decoder, the audio data and the metadata to obtain decoded audio data and the metadata;
- (c) determining, by the decoder, from the metadata, one or more processing parameters for dynamic loudness adjustment based on a playback condition;
- (d) applying the determined one or more processing parameters to the decoded audio data to obtain processed audio data; and
- (e) outputting the processed audio data for playback.

EEE2. The method according to EEE1, wherein the metadata is indicative of processing parameters for dynamic loudness adjustment for a plurality of playback conditions.

EEE3. The method according to EEE1 or EEE2, wherein said determining the one or more processing parameters further includes determining one or more processing parameters for dynamic range compression, DRC, based on the playback condition EEE4. The method according to any one of EEE1 to EEE3, wherein the playback condition includes one or more of a device type of the decoder, characteristics of a playback device, characteristics of a loudspeaker, a loudspeaker setup, characteristics of background noise, characteristics of ambient noise and characteristics of the acoustic environment.

EEE5. The method according to any one of EEE1 to EEE4, wherein process (c) further includes selecting, by the decoder, at least one of a set of DRC sequences, DRCSet, a set of equalizer parameters, EQSet, and a downmix, corresponding to the playback condition.

EEE6. The method according to EEE5, wherein process (c) further includes identifying a metadata identifier indicative of the at least one selected DRCSet, EQSet, and downmix to determine the one or more processing parameters from the metadata.

EEE7. The method according to any one of EEE1 to EEE6, wherein the metadata includes one or more processing parameters relating to average loudness values and optionally one or more processing parameters relating to dynamic range compression characteristics.

EEE8. The method according to any one of EEE1 to EEE7, wherein the bitstream further includes additional metadata for static loudness adjustment to be applied to the decoded audio data.

EEE9. The method according to any one of EEE1 to EEE8, wherein the bitstream is an MPEG-D DRC bitstream and the presence of metadata is signaled based on MPEG-D DRC bitstream syntax.

EEE10. The method according to EEE9, wherein a loudnessInfoSetExtension( )-element is used to carry the metadata as a payload.

EEE11. The method according to any one of EEE1 to EEE10, wherein the metadata comprises one or more metadata payloads, wherein each metadata payload includes a plurality of sets of parameters and identifiers, with each set including at least one of a DRCSet identifier, drcSetId, an EQSet identifier, eqSetId, and a downmix identifier, downmixId, in combination with one or more processing parameters relating to the identifiers in the set.

EEE12. The method according to EEE11 when depending on EEE5, wherein process (c) involves selecting a set among the plurality of sets in the payload based on the at least one DRCSet, EQSet, and downmix selected by the decoder, and wherein the one or more processing parameters determined at process (c) are the one or more processing parameters relating to the identifiers in the selected set.

EEE13. A decoder for metadata-based dynamic processing of audio data for playback, wherein the decoder comprises one or more processors and non-transitory memory configured to perform a method including processes of:
- (a) receiving, by a decoder, a bitstream including audio data and metadata for dynamic loudness adjustment;
- (b) decoding, by the decoder, the audio data and the metadata to obtain decoded audio data and the metadata;
- (c) determining, by the decoder, from the metadata, one or more processing parameters for dynamic loudness adjustment based on a playback condition;
- (d) applying the determined one or more processing parameters to the decoded audio data to obtain processed audio data; and
- (e) outputting the processed audio data for playback.

EEE14. A method of encoding audio data and metadata for dynamic loudness adjustment, into a bitstream, the method including processes of:
- (a) inputting original audio data into a loudness leveler for loudness processing to obtain, as an output from the loudness leveler, loudness processed audio data;
- (b) generating metadata for dynamic loudness adjustment based on the loudness processed audio data and the original audio data; and
- (c) encoding the original audio data and the metadata into the bitstream.

EEE15. The method according to EEE14, wherein the method further includes generating additional metadata for static loudness adjustment to be used by a decoder.

EEE16. The method according to EEE14 or EEE15, wherein process (b) includes comparison of the loudness processed audio data to the original audio data, and wherein the metadata is generated based on a result of said comparison.

EEE17. The method according to EEE16, wherein process (b) further includes measuring the loudness over one or more pre-defined time periods, and wherein the metadata is generated further based on the measured loudness.

EEE18. The method according to EEE17, wherein the measuring comprises measuring overall loudness of the audio data.

EEE19. The method according to EEE17, wherein the measuring comprises measuring loudness of dialogue in the audio data.

EEE20. The method according to any one of EEE14 to EEE19, wherein the bitstream is an MPEG-D DRC bitstream and the presence of the metadata is signaled based on MPEG-D DRC bitstream syntax.

EEE21. The method according to EEE20, wherein a loudnessInfoSetExtension( )-element is used to carry the metadata as a payload.

EEE22. The method according to any one of EEE14 to EEE21, wherein the metadata comprises one or more metadata payloads, wherein each metadata payload includes a plurality of sets of parameters and identifiers, with each set including at least one of a DRCSet identifier, drcSetId, an EQSet identifier, eqSetId, and a downmix identifier, downmixId, in combination with one or more processing parameters relating to the identifiers in the set, and wherein the one or more processing parameters are parameters for dynamic loudness adjustment by a decoder.

EEE23. The method according to EEE22, wherein the at least one of the drcSetId, the eqSetId, and the downmixId is related to at least one of a set of DRC sequences, DRCSet, a set of equalizer parameters, EQSet, and a downmix, to be selected by the decoder.

EEE24. An encoder for encoding in a bitstream original audio data and metadata for dynamic loudness adjustment, wherein the encoder comprises one or more processors and non-transitory memory configured to perform a method including the processes of:

(a) inputting original audio data into a loudness leveler for loudness processing to obtain, as an output from the loudness leveler, loudness processed audio data;

(b) generating the metadata for dynamic loudness adjustment based on the loudness processed audio data and the original audio data; and (c) encoding the original audio data and the metadata into the bitstream.

EEE25. A system of an encoder for encoding in a bitstream original audio data and metadata for dynamic loudness adjustment and/or dynamic range compression, DRC, according to EEE24 and a decoder for metadata-based dynamic processing of audio data for playback according to EEE13.

EEE26. A computer program product comprising a computer-readable storage medium with instructions adapted to cause the device to carry out the method according to any one of EEE1 to EEE12 or EEE14 to EEE23 when executed by a device having processing capability.

EEE27. A computer-readable storage medium storing the computer program product of EEE26.

EEE28. The method according to any one of EEE 1 to EEE12 further comprising receiving, by the decoder, through an interface, an indication of whether or not to perform the metadata-based dynamic processing of audio data for playback, and when the decoder receives an indication not to perform the metadata-based dynamic processing of audio data for playback, bypassing at least the step of applying the determined one or more processing parameters to the decoded audio data.

EEE29. The method according to EEE28, wherein until the decoder receives, through the interface, the indication of whether or not to perform the metadata-based dynamic processing of audio data for playback, the decoder bypasses at least the step of applying the determined one or more processing parameters to the decoded audio data.

EEE30. The method of any one of EEE 1 to EEE12, EEE28, or EEE29, wherein the metadata is indicative of processing parameters for dynamic loudness adjustment for a plurality of playback conditions, and the metadata further includes a parameter specifying a loudness measurement method used for deriving a processing parameter of the plurality of processing parameters.

EEE31. The method of any one of EEE1 to EEE12, or EEE28 to EEE30, wherein the metadata is indicative of processing parameters for dynamic loudness adjustment for a plurality of playback conditions, and the metadata further includes a parameter specifying a loudness measurement system used for measuring a processing parameter of the plurality of processing parameters.

The invention claimed is:

1. A method of metadata-based dynamic processing of audio data for playback, the method including:

receiving, by a decoder, a bitstream including audio data and metadata for dynamic loudness adjustment, wherein the metadata for dynamic loudness adjustment comprises a plurality of sets of metadata, wherein each set of metadata corresponds to a respective playback condition;

decoding, by the decoder, the audio data and the metadata to obtain decoded audio data and the metadata;

selecting, in response to playback condition information provided to the decoder, a set of metadata corresponding to a specific playback condition, and extracting, from the selected set of metadata, one or more processing parameters for dynamic loudness adjustment;

applying the extracted one or more processing parameters to the decoded audio data to obtain processed audio data;

outputting the processed audio data for playback, and wherein the selected set of metadata includes a set of dynamic range compression, DRC, sequences, DRCSet, wherein the bitstream is an MPEG-D DRC bitstream and the presence of metadata is signaled based on MPEG-D DRC bitstream syntax, and wherein the metadata for dynamic loudness adjustment comprises one or more metadata payloads, wherein each metadata payload includes a plurality of sets of parameters and identifiers, with each set including a respective downmix identifier, downmixId, in combination with one or more processing parameters for the dynamic loudness adjustment relating to the downmix identifier in the set.

2. The method according to claim 1, wherein a loudnessInfoSetExtension( )-element is used to carry the metadata as a payload.

3. A decoder for metadata-based dynamic processing of audio data for playback, wherein the decoder comprises one or more processors and non-transitory memory configured to perform a method including:

receiving, by the decoder, a bitstream including audio data and metadata for dynamic loudness adjustment, wherein the metadata for dynamic loudness adjustment comprises a plurality of sets of metadata, wherein each set of metadata corresponds to a respective playback condition;

decoding, by the decoder, the audio data and the metadata to obtain decoded audio data and the metadata;

selecting, in response to a playback condition provided to the decoder a set of metadata corresponding to a specific playback condition, and extracting, from the selected set of metadata, one or more processing parameters for dynamic loudness adjustment;

applying the extracted one or more processing parameters to the decoded audio data to obtain processed audio data;

outputting the processed audio data for playback, and wherein the selected set of metadata includes a set of dynamic range compression, DRC, sequences, DRC-Set, wherein the bitstream is an MPEG-D DRC bitstream and the presence of metadata is signaled based on MPEG-D DRC bitstream syntax, and wherein the metadata for dynamic loudness adjustment comprises one or more metadata payloads, wherein each metadata payload includes a plurality of sets of parameters and identifiers, with each set including a respective downmix identifier, downmixId, in combination with one or more processing parameters for the dynamic loudness adjustment relating to the downmix identifier in the set.

4. A method of encoding audio data and metadata for dynamic loudness adjustment into a bitstream, the method including:

inputting original audio data into a loudness leveler for loudness processing to obtain, as an output from the loudness leveler, loudness processed audio data;

generating the metadata for dynamic loudness adjustment based on the loudness processed audio data and the original audio data; and encoding the original audio data and the metadata into the bitstream, wherein the metadata comprises a plurality of sets of metadata, wherein each set of metadata corresponds to a respective playback condition, wherein the bitstream is an MPEG-D DRC bitstream and the presence of metadata is signaled based on MPEG-D DRC bitstream syntax, and wherein the metadata for dynamic loudness adjustment comprises one or more metadata payloads, wherein each metadata payload includes a plurality of sets of parameters and identifiers, with each set including a respective downmix identifier, downmixId, in combination with one or more processing parameters relating to the downmix identifier in the set, and wherein the one or more processing parameters are parameters for dynamic loudness adjustment by a decoder.

5. The method according to claim 4, wherein the method further includes generating additional metadata for static loudness adjustment to be used by a decoder.

6. The method according to claim 4, wherein said generating metadata includes comparison of the loudness processed audio data to the original audio data, and wherein the metadata is generated based on a result of said comparison.

7. The method according to claim 6, wherein said generating metadata further includes measuring the loudness over one or more pre-defined time periods, and wherein the metadata is generated further based on the measured loudness.

8. The method according to claim 7, wherein the measuring comprises measuring overall loudness of the audio data.

9. The method according to claim 7, wherein the measuring comprises measuring loudness of dialogue in the audio data.

10. The method according to claim 4, wherein a loudnessInfoSetExtension( )-element is used to carry the metadata as a payload.

11. An encoder for encoding in a bitstream original audio data and metadata for dynamic loudness adjustment, wherein the encoder comprises one or more processors and non-transitory memory configured to perform a method including:

inputting original audio data into a loudness leveler for loudness processing to obtain, as an output from the loudness leveler, loudness processed audio data;

generating the metadata for dynamic loudness adjustment based on the loudness processed audio data and the original audio data; and encoding the original audio data and the metadata into the bitstream, wherein the metadata comprises a plurality of sets of metadata, wherein each set of metadata corresponds to a respective playback condition, wherein the bitstream is an MPEG-D DRC bitstream and the presence of metadata is signaled based on MPEG-D DRC bitstream syntax, and wherein the metadata for dynamic loudness adjustment comprises one or more metadata payloads, wherein each metadata payload includes a plurality of sets of parameters and identifiers, with each set including a respective downmix identifier, downmixId, in combination with one or more processing parameters relating to the downmix identifier in the set, and wherein the one or more processing parameters are parameters for dynamic loudness adjustment by a decoder.

12. A non-transitory computer-readable storage medium with instructions adapted to cause a device to carry out the method according to claim 1 when executed by a device having processing capability.

13. A non-transitory computer-readable storage medium with instructions adapted to cause a device to carry out the method according to claim 4 when executed by a device having processing capability.

* * * * *